UNITED STATES PATENT OFFICE.

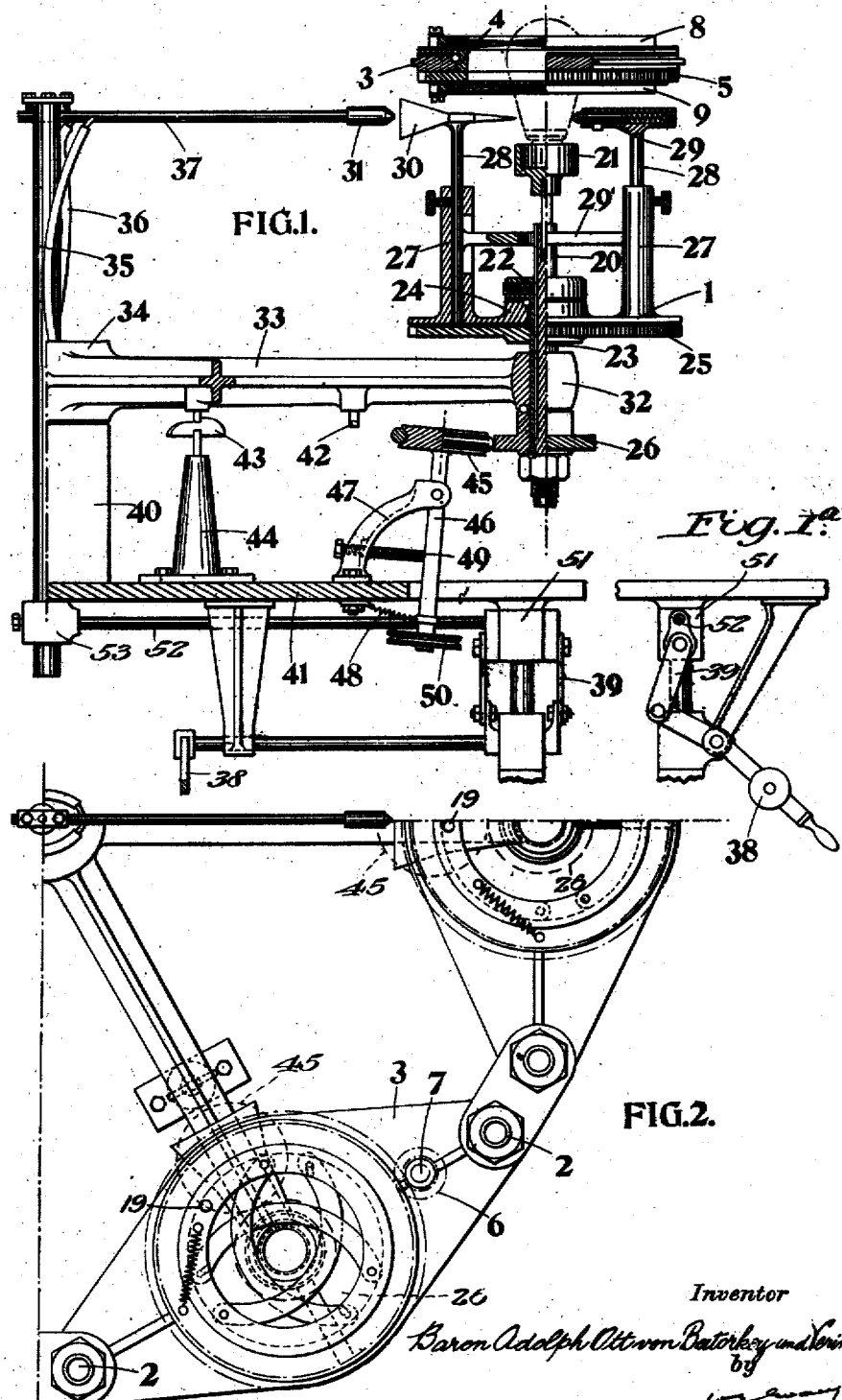

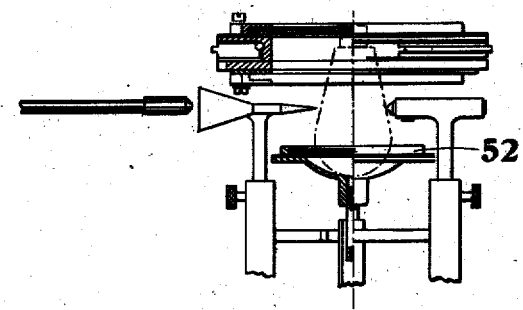
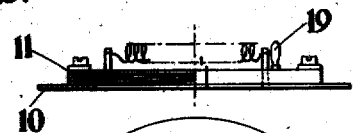
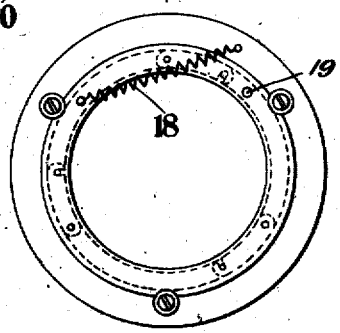
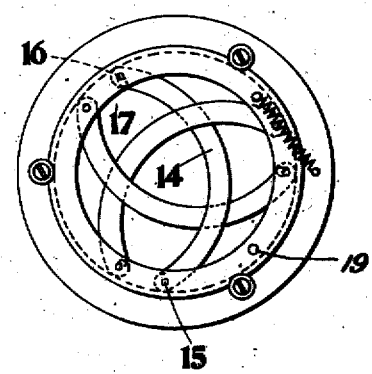

ADOLPH BARON OTT VON BATORKEZ UND VERINKHAZ, OF WEST KENSINGTON, LONDON, ENGLAND, ASSIGNOR TO ALADDIN LAMP SYNDICATE LIMITED, (IN LIQUIDATION,) OF LONDON, ENGLAND.

MACHINE FOR CUTTING ELECTRIC BULBS AND REGENERATING THEM.

1,313,845.  Specification of Letters Patent.  Patented Aug. 19, 1919.

Application filed May 7, 1914. Serial No. 837,095.

*To all whom it may concern:*

Be it known that I, ADOLPH BARON OTT VON BATORKEZ UND VERINKHAZ, a subject of H. M. the Emperor of Austria, residing at 3 Perham Road, West Kensington, London, W., England, have invented a certain new and useful Machine for Cutting Electric Bulbs and Regenerating Them, of which the following is a specification.

It is already known in cutting glass tubes to utilize hot cutting methods, with or without a mark previously made with a steel cutter or a diamond; nevertheless in the case of large diameters of 40 mm. and over, it is preferable, in order to obtain a clean cut to scratch the wall internally with a diamond before effecting the heating. In order to do this a small diamond set in a metal holder fixed to the end of a rod is employed; the diameter of this rod should be such as to permit of introducing it into the glass tube in such a manner as to reach the point at which the cut is to be made. By then heating with the very pointed flame of a blowpipe the outer mark or the outer and inner marks made on the glass wall, the scratch is converted into a crack. If care be had to impart a movement of rotation to the tube, the crack extends along the heated portion whereby the wall is separated into two parts. If the tube rotates about its axis, the blowpipe remaining stationary, and if the scratch is wholly situated in a plane perpendicular to the said axis, the section will be straight; in the contrary case, the section may be elliptical or oblique.

The present invention has for its object to provide a single or multiple machine for carrying into practice the process set forth above for cutting electric incandescent lamps for the purpose of removing the filament. The lamp is suspended and centered upon a support by means of two sleeves effecting automatic and concentric clamping and which receive a movement of rotation about their common axis, in such a manner that the bulb can be displaced angularly relatively to a diamond rigidly fixed upon the machine and to a nozzle for the injection of the heating or cooling agent. Moreover, the part of the bulb that is to be detached from the part remaining suspended beneath the rotating sleeves effecting concentric clamping and which may or may not itself be clamped by a centering and fixing sleeve, is received in a support or in a claw; this support being carried by a vertical shaft, whose axis is in line with that of the bulb and participates in the movement of displacement that this latter receives. With the object of permitting of accurately and instantaneously fixing and centering the bulb in the sleeves serving to impart to them a movement of rotation around its axis, the sleeves are constructed upon the principle of the iris shutters well known in photography. Each of the sleeves is constituted by two superposed rings adapted to be displaced angularly relatively to each other and which have curved arms between them. These arms, which are equal, are pivoted to one of the rings and act in combination with grooves therein; they are united by means of fingers upon their opposite extremities in such a manner that normally and under the influence of a counter spring producing their maximum angular separation, the arms intersect across the rings and symmetrically relatively to the axis around which the latter rotate. It will be understood that, in these conditions, any body of revolution arranged between the arms will be clamped by them and at the same time centered relatively to the axis around which it is intended to be rotated by the system supporting it.

The invention is illustrated by way of example in the accompanying drawing, in which:

Figure 1 is a vertical section of a semi-automatic head for a machine embodying the invention, Fig. 1ᵃ is a detail view.

Fig. 2 is a corresponding plan,

Fig. 3 shows respectively in vertical section and in plan, in the closed position, the automatic clamping arms which enable the bulbs to be clamped and rotated in front of the diamond and the nozzle for the injection of the hot gas or current of cold air.

Fig. 4 is a vertical section showing a modified form of the semi-automatic head of the machine.

Broadly speaking each head is constituted by a frame 1 which, by means of vertical pillars 2 carries a support 3. This support which is recessed centrally serves as a guide bearing for a central socket 4 rotating on balls by means of a toothed ring 5. This ring 5 meshes with a pinion 6 upon a vertical shaft 7 which passes through the frame 1. Upon either side of the horizontal faces of the support 3, the central socket 4 carries automatic clamping sleeves 8, 9 tending to fix the bulb in such a manner that its axis coincides with the axis of rotation of the whole constituted by the socket 4 and the clamping sleeves 8, 9 carried by the latter.

The automatic clamping sleeves 8, 9 (Figs. 3 and 4), resemble shutters of the iris type as employed in photography, and comprise rings 10 which are fixed upon the upper and lower faces of the movable socket 4. These rings receive respectively an annular metal cup 11 which is held by the uprights 12 and the washers 13 but which is adapted for angular displacement relatively to the corresponding supporting ring 10 by sliding between the suitably shaped faces of the said uprights 12. Arc shaped metal arms 14 are housed in the cup 11; these arms are similar and are fixed to the bottom of the cup by means of pivot pins 15. At their opposite extremities the metal arms 14 have fingers 16 which enter guide slots 17 formed in the ring 10 of the sleeve. As the arms 14 are of the same length, their pivot pins 15 and the guide slots 17 in which the fingers 16 upon them engage are located at equal distances one from the other, both upon the bottom of the cup 11 in which they are housed and in the ring 10. The cup 11, which is capable of angular displacement relatively to the ring 10 which is fastened to the socket 4 (which as already stated is given a continuous movement of rotation around its axis) is subjected to the action of a counter spring 18 which is connected to the said ring 10 in such a manner that the arm 14 are displaced and intersect symmetrically in the aperture of the central socket 4. By the manipulation of a knob 19 with which the cups 11 are provided, it is possible, owing to the relative angular displacement imparted to them, to cause the arms 14 to approach or recede from each other; owing to the fact that their pivots 15 are integral with the movable cup 11 and that they oscillate in such a manner as to assume a position at variable distances from the general axis of rotation of the system, these arms are displaced by the engagement of the fingers 16 on their opposite extremities in the slots 17 in the ring 10. When the knobs 19 are released, the springs 18 act to return the cups to their original position and the arms 14 approach the axis in such a manner as to clamp the object that has been arranged between them and center it, because they all receive the same displacement relatively to the axis.

Beneath the assemblage of the movable socket 4 which produces the rotation of its two concentric sleeves 8, 9 there is arranged in the axis defined by the uniform clamping of these sleeves, a vertical shaft 20 which passes through the frame 1. This shaft receives a socket 21 the height of which is adjustable at will and it is itself fixed by means of a resilient feather 22 in a tubular sleeve 23 which bears, through the intermediary of a ball bearing, upon a central boss 24 of the frame 1 through which it passes. This sleeve 23 carries a toothed ring 25 which transmits the movement to the vertical shaft 7 through a corresponding pinion and is driven by a roller 26 which is fixed upon it.

In these conditions it will be noted that by acting upon the knobs 19 of the concentric sleeves 8, 9 it is possible to displace the arms 14 in such a manner as to free the central aperture of the socket 4 for the insertion of a lamp therein. On releasing the knobs 19 the springs 18 again close the arms 14 and center and lock the lamp inclosed therein. The lamp is thus suspended beneath the socket 4 which it causes to rotate about its axis; the base of the lamp being engaged in the lower cup 21 which participates in the same angular displacement (Fig. 1.)

It will be noted that the lamp which thus rotates around its axis of symmetry is accessible, throughout its entire periphery, beneath the upper support 3 to which it is pendent, in such a manner that there is no obstacle to the arrangement upon the frame 1 of the devices for cutting the wall of the bulb. The frame 1 comprises two hollow uprights 27 in which two rods 28 are adapted to be displaced and fixed at an appropriate height. These rods 28, which are united by a stay 29', whose central portion embraces the shaft 20, respectively carry the diamond holder 29 which is thus rigidly fixed and a nozzle 30 whose flattened nose is adapted to embrace a portion of the periphery of the lamp. The aperture in this nose renders it possible to project upon the wall a thin layer of hot gases or of cold air in such a manner as to crack the glass bulb and separate it into two parts. Obviously the nozzle and the diamond holder might be fixed to the rods 28 in such a manner as to be displaced horizontally or given any direction desired relatively to the bulb.

As the sleeves 8, 9 move in parallel planes every point of the wall describes a circumference in front of the spring pressed diamond 29 on the one hand and in front of the slot in the nozzle 30 on the other hand. In these conditions when, owing to the displacement of the bulb at an appropriate speed the diamond has traced a circumference upon the wall of the bulb, it is only necessary to render operative a blow pipe 31 which injects through the nozzle 30 a jet of hot air which cuts the bulb into two parts in accordance with the scratch made by the diamond, because the height of the diamond is exactly the same as that of the slot in the said nozzle 30. It is then possible, if necessary, to inject cold air into the same nozzle 30 to complete the separation.

The lower part of the bulb will then fall into the cup 21 driven by the shaft 20; it can be withdrawn from this cup after the upper part of the lamp has been removed from the fixing and centering sleeves 8, 9 merely by exerting traction upon it.

It is then only necessary to arrange a second bulb in the sleeves 8, 9 in order to sever it in the manner already described. When the bulbs severed in the manner described have been heated in such a manner as to burn the carbonaceous deposit which rendered them obscure and after the filament has been repaired or replaced, it is only necessary to bring together the constituent parts of the bulbs and unite them under the action of the flame of a suitable blowpipe, thereby reconstituting the lamps. In again producing a vacuum by known means a regenerated lamp is obtained which can be utilized as a new lamp.

It is obvious that in practice a machine would be provided with a number of heads adapted for rotation about a vertical shaft. In this manner an operative would be constantly employed in fitting lamps into the heads presenting themselves in front of her.

In the example illustrated in Fig. 2 a portion of a machine comprising six heads has been shown. The frames 1 of the heads rest by means of bosses upon a ring 32 united by arms 33 to a hub 34, the uprights 2 insure the fixing of the heads 1 upon the ring 32 and pass through the bosses with which the frames are provided in the manner indicated. The hub 34 is guided by a hollow central shaft 35 which is utilized as a protecting sheath for the conduits 36 conducting the heating or cooling agent to the branches 37 of the blowpipes or injectors 31 in front of whose orifices the nozzles 30 of each head present themselves in succession. This sheath 35, which carries the branches 37, is also adapted to be raised or lowered at will by means of a counterweighted lever 38 which acts upon the whole by the jointed rod transmission 39 (see detail view Fig. 1ª). The sleeve 35 has carried upon it a boss 53 mounted upon the rod 52 which at the opposite end is carried by the sliding sleeve 51 to which movement is imparted by the lever 38 through the links 39.

The hub 34 carrying the driving ring 32 runs by means of a ball race upon the face of a boss 40 provided at the center of a plate 41. This plate, which serves as a base for the machine and which can be provided with supporting feet carries the transmission actuating the system and also stop mechanism locking the heads 1 in a given position. With this object, tappets 42 are arranged beneath the ring 32 and are adapted to engage in succession with a resilient bolt 43 serving as a stop. This bolt is carried by a hollow vertical sleeve 44 fixed to the table 41. In line with the positions intended to be occupied by the heads 1 relatively to the vertical axis of the machine driving rollers 45 are arranged beneath the ring 32; these rollers act upon the corresponding roller 26 driving the shafts 20 and the assemblage of automatic centering sleeves 8, 9 which hold the lamps. The spindles of the rollers 45 are arranged in sleeves 46 which are pivoted upon arms 47 belonging to the fixed table 41. This sleeve 46 is subjected to the action of a spring 48 which tends to engage the corresponding roller 45 with the roller 26 of the head 1 of the machine. The displacement in this direction is limited by a stop screw 49. The roller 45 receives its movement from the pulley 50 through a belt. Three driving rollers 45 may advantageously be provided for each movable head 1 in suitable positions to insure that the roller 26 of the head shall always be driven whatever disturbance may be experienced in the position defined by the stops 42 in combination with the bolt 43.

It is obvious that the lamp might be arranged inverted in the concentric clamping sleeves 8, 9 which insure its fixing and its centering relatively to the axis around which it is displaced. Thus, for example, the bulb might be fitted with its base uppermost as shown in Fig. 4 in which case the sleeves 8, 9 clamp the base and the upper part of the bulb between their respective arms 14. In this case the cup 21 might be provided with a concentric clamping sleeve 52 like the upper sleeves 8, 9; as this sleeve 52 serves to fix the lower part of the lamp body and cause it to participate in the general driving movement. The arrangements for insuring the severing of the wall of the bulb and its separation into two parts of course remain identical with those described in the embodiment of the invention hereinbefore described above.

What I claim as my invention and desire to secure by Letters Patent is:—

1. A machine for transversely cutting the bulbs of electric incandescent lamps, consisting of an annular support, means carried by the said support for holding the lamp and comprising two rings adjustable with respect to each other and identically curved arms pivoted to one of the said rings and engaging at their opposite ends with the other ring within guide slots formed therein, means for moving the said rings in relation one to the other, means for holding the lamp at its lower extremity, means for the rotation of the lamp in the position in which it is held as aforesaid and means for cutting the lamp on its rotation, substantially as described.

2. In a machine for dividing electric light bulbs in order to afford access to the interior of said bulbs, a centering clutch for supporting a lamp at one zone thereof, means for supporting the lamp at another part thereof, means for rotating the lamp and its supports, a spring-pressed glass cutter adapted to be arranged in fixed vertical and tangential position while capable of radial movement to conform to inequalities of the bulb, and a slotted nozzle for flame and hot air, opposite said spring-pressed glass cutter, whereby a bulb may be centered and divided by a single operative act.

3. In a machine for dividing electric bulbs, in combination, a rotating table for supporting one end of a lamp, an annular support through which said lamp may project for supporting said lamp in a zone remote from the supported end, a ring carried by said support and concentric therewith, lamp clutching links connecting the support and ring, a spring to hold the clutching links out of clutching position, and means whereby the links may be moved past clutching position to be drawn into such position by said spring.

In testimony whereof I have hereunto signed my name to this specification in the presence of two subscribing witnesses.

ADOLPH BARON OTT
  VON BATORKEZ UND VERINKHAZ.

Witnesses:
 ROBERT OWEN HUGHES,
 H. D. JAMESON.